(12) United States Patent
Collin et al.

(10) Patent No.: US 10,322,880 B2
(45) Date of Patent: Jun. 18, 2019

(54) SYSTEM AND METHOD OF SEQUENCING FOR AT LEAST ONE PREPARING STATION

(71) Applicant: SAVOYE, Dijon (FR)

(72) Inventors: Jean-Michel Collin, Merceuil (FR); Stephane Pietrowicz, Fixin (FR)

(73) Assignee: SAVOYE, Dijon (FR)

( * ) Notice: Subject to any disclaimer, the term of this patent is extended or adjusted under 35 U.S.C. 154(b) by 0 days.

(21) Appl. No.: 15/543,485

(22) PCT Filed: Jan. 11, 2016

(86) PCT No.: PCT/EP2016/050401
§ 371 (c)(1),
(2) Date: Jul. 13, 2017

(87) PCT Pub. No.: WO2016/113230
PCT Pub. Date: Jul. 21, 2016

(65) Prior Publication Data
US 2018/0009605 A1    Jan. 11, 2018

(30) Foreign Application Priority Data

Jan. 13, 2015  (FR) ...................................... 15 50260

(51) Int. Cl.
*B65G 1/137*       (2006.01)
*B65G 1/127*       (2006.01)
(Continued)

(52) U.S. Cl.
CPC ............. *B65G 1/137* (2013.01); *B65G 1/127* (2013.01); *B65G 1/1378* (2013.01); *B65G 17/44* (2013.01);
(Continued)

(58) Field of Classification Search
CPC ................................ B65G 1/127; B65G 1/137
See application file for complete search history.

(56) References Cited

U.S. PATENT DOCUMENTS 5,050,726 A * 9/1991  Flagg ................... B65G 17/123
                                                        198/475.1
5,171,120 A   12/1992 Bernard et al.
(Continued)

FOREIGN PATENT DOCUMENTS

DE      10123327 C1    11/2002
DE      10225332 A1     1/2004
(Continued)

OTHER PUBLICATIONS

English translation of the Written Opinion of the International Searching Authority dated Jul. 21, 2016 for corresponding International Application No. PCT/EP2016/050401, filed Jan. 11, 2016.
(Continued)

*Primary Examiner* — Thomas Randazzo
(74) *Attorney, Agent, or Firm* — David D. Brush; Westman, Champlin & Koehler, P.A

(57) ABSTRACT

A system for sequencing a preparing station that sequences loads coming from an external unit via an entering outbound conveyor. The system includes a paternoster, a buffer location and a managing unit, which processes each load that comes to an entrance of the paternoster according to one of the following modes (selected as a function of a place desired for the load in a sequence): (a) after introduction into the paternoster, the load undergoes a bypass transfer between two nacelles positioned face to face and then presented to an exiting outbound conveyor; (b) after introduction into the paternoster, the load undergoes a buffer transfer towards a given buffer location and then subsequently re-positioned again in the paternoster and finally presented to the exiting outbound conveyor; (c) after introduction into the paternoster, the load is transported therein without bypass transfer or buffer transfer and then presented to the exiting outbound conveyor.

15 Claims, 9 Drawing Sheets

Figure 3A:
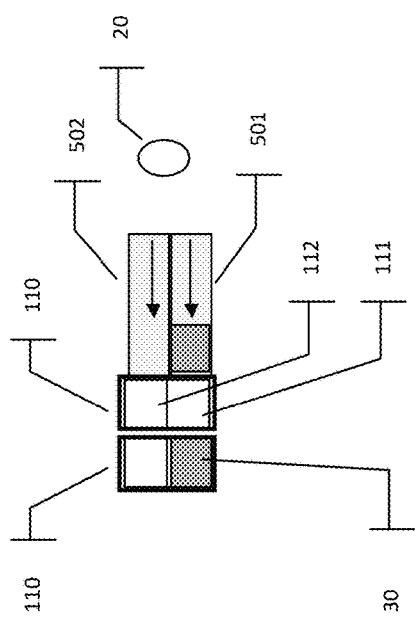
Figure 3B:
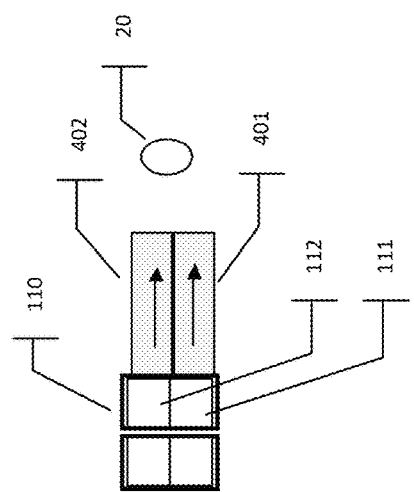
Figure 3C:
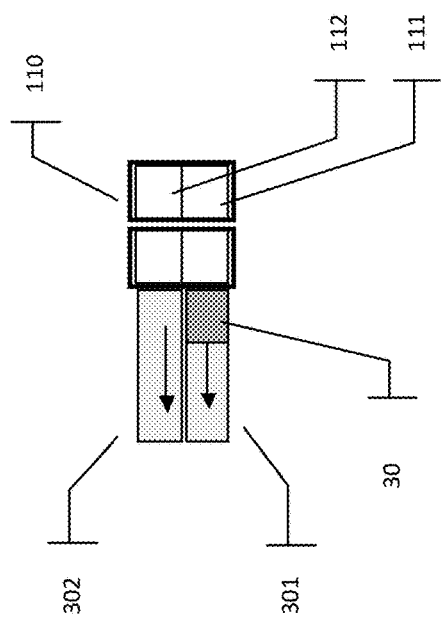
Figure 3D:
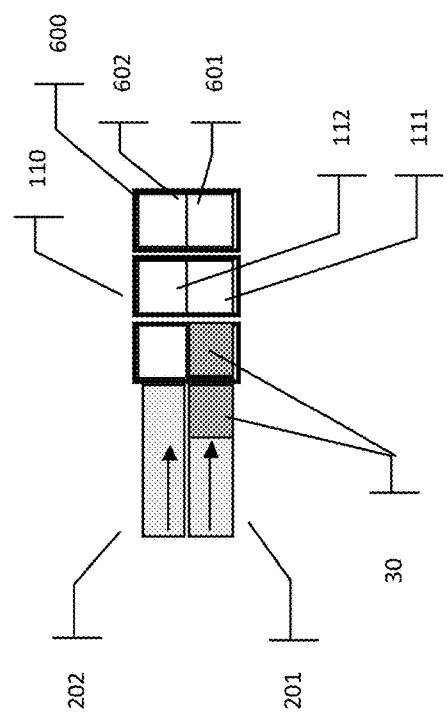

(51) Int. Cl.
 *B65G 17/44* (2006.01)
 *B65G 47/50* (2006.01)
 *B65G 47/57* (2006.01)

(52) U.S. Cl.
 CPC ............ *B65G 47/50* (2013.01); *B65G 47/57* (2013.01); *B65H 2301/42256* (2013.01); *B65H 2701/1912* (2013.01)

(56) References Cited

U.S. PATENT DOCUMENTS

| | | | | |
|---|---|---|---|---|
| 2004/0149541 A1* | 8/2004 | Sauer | ............... | B65G 1/127 198/347.2 |
| 2004/0182684 A1* | 9/2004 | Guidetti | ............... | B65G 43/08 198/781.06 |
| 2004/0238326 A1* | 12/2004 | Lichti | ............... | B65G 1/127 198/475.1 |
| 2009/0074545 A1* | 3/2009 | Lert, Jr. | ............... | B65G 1/0492 414/276 |
| 2010/0108464 A1* | 5/2010 | Davi | ............... | B65G 1/127 198/347.1 |
| 2010/0316468 A1* | 12/2010 | Lert | ............... | B65G 1/045 414/273 |
| 2012/0186942 A1* | 7/2012 | Toebes | ............... | B65G 1/0485 198/429 |
| 2012/0195720 A1* | 8/2012 | Sullivan | ............... | B65G 1/04 414/277 |
| 2014/0039667 A1* | 2/2014 | Collin | ............... | B65G 1/0485 700/215 |

FOREIGN PATENT DOCUMENTS

| | | |
|---|---|---|
| EP | 1857381 A2 | 11/2007 |
| EP | 2487123 A1 | 8/2012 |
| JP | S60167805 A | 8/1985 |
| WO | 2006137096 A1 | 12/2006 |

OTHER PUBLICATIONS

International Search Report dated Mar. 9, 2016 for corresponding International Application No. PCT/EP2016/050401, filed Jan. 11, 2016.

Written Opinion of the International Searching Authority dated Jul. 21, 2016 for corresponding International Application No. PCT/EP2016/050401, filed Jan. 11, 2016.

\* cited by examiner

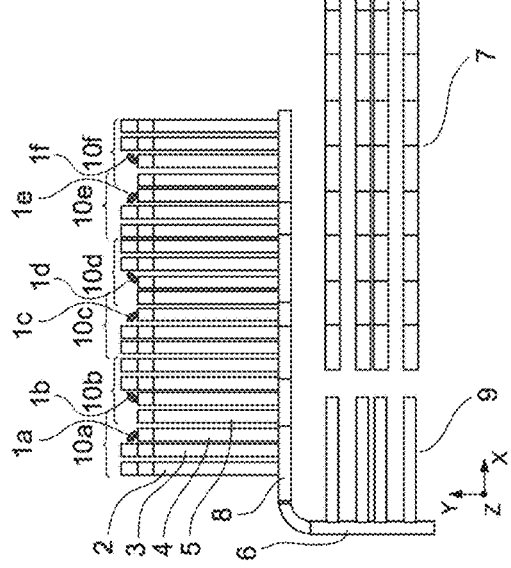
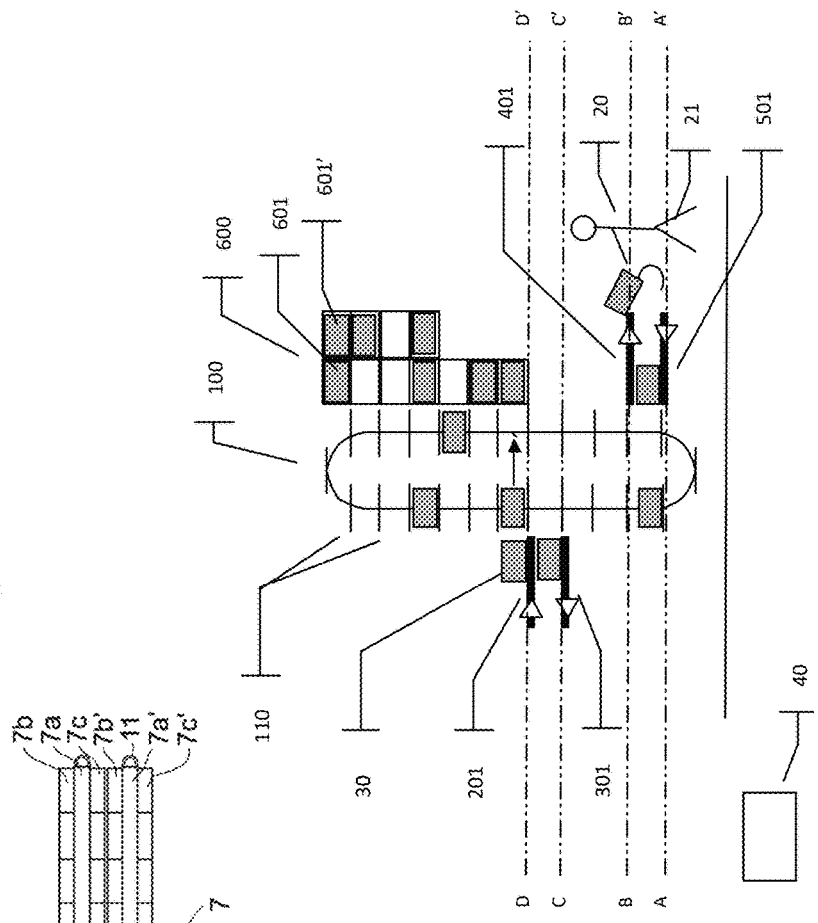
Figure 1 (prior art)
Figure 2

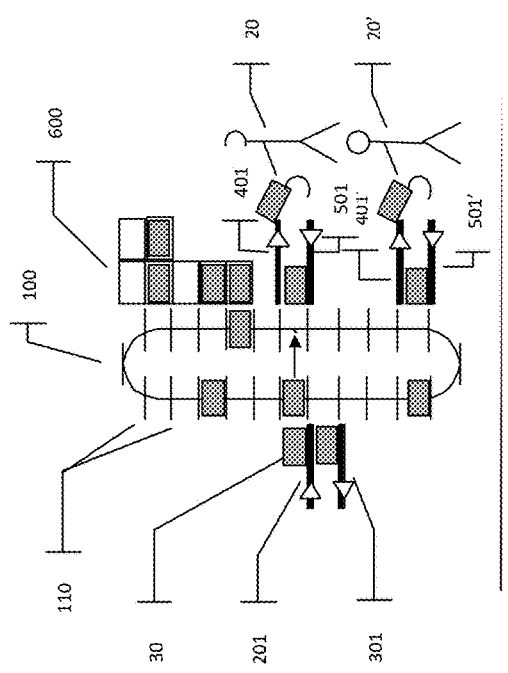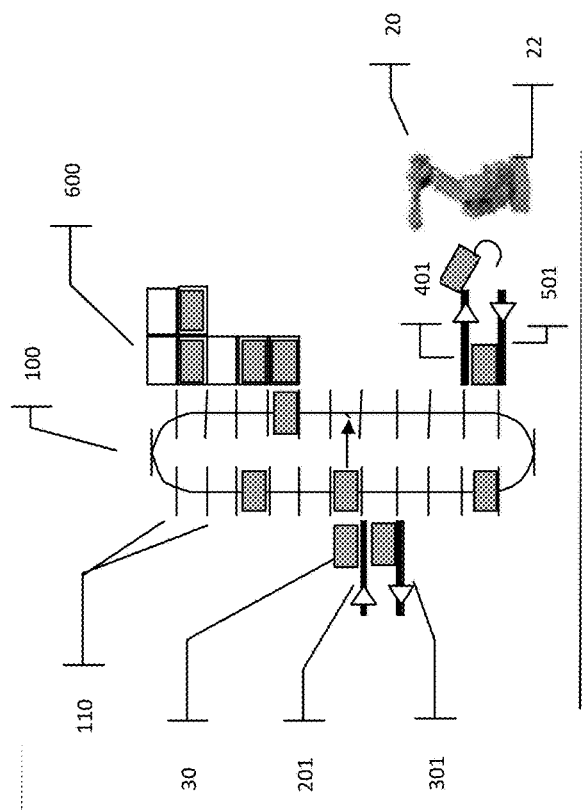

SYSTEM AND METHOD OF SEQUENCING FOR AT LEAST ONE PREPARING STATION

CROSS-REFERENCE TO RELATED APPLICATIONS

This Application is a Section 371 National Stage Application of International Application No. PCT/EP2016/050401, filed Jan. 11, 2016, which is incorporated by reference in its entirety and published as WO/2016/113230 on Jul. 21, 2016, not in English.

1. FIELD OF THE INVENTION

The field of the invention is that of logistics.

The present invention relates more specifically to a system of sequencing for at least one preparing (or picking) station. Such a system is configured to sequence loads coming from at least one external unit (for example a warehouse), through at least one entering outbound conveyor and to provide said at least one preparing or picking station, through at least one exiting outbound container, with at least one sequence comprising loads in a desired sequential order.

The present invention can be applied to any type of preparing station whatsoever, and especially but not exclusively to:

order preparation stations (also called "picking" stations) that work by picking items or goods from storage containers (also called load sources): an operator (or a robot) receives a pick list (on paper, on a terminal screen, in voice form or in the form of a computer task (when it is a robot) etc.). For each package to be shipped (also called a "shipping container" or "target load"), this list informs the operator or robot about quantity of each type of items or goods that he must collect in storage containers and group together in the package to be shipped; and to stations for the palletization of storage containers (also called "source loads") themselves containing items: an operator (or a robot) receives a pick list (on paper, on a computer screen, in voice form, in the form of a computer task (when it is a robot), etc.). For each pallet to be shipped (also called a "shipping container" or "target load"), this list informs the operator or robot about the quantity of storage containers of each type (for example cardboard boxes) that he must collect and remove onto the pallet to be shipped.

2. TECHNOLOGICAL BACKGROUND

Referring now to FIG. 1, a top view is presented of an example of a known configuration for an automated storage system for preparing packages comprising:

a warehouse 7 comprising several sets (two in this example) each formed by an alley 7a, 7a' feeding, on either side, a storage shelf 7b, 7c, 7b', 7c' with several superimposed stacking levels;

a set of conveyors taking source loads from the warehouse up to the preparation or preparing stations and vice versa. In the example of FIG. 1, three sub-assemblies of conveyors referenced 6, 8 and 9 respectively can be distinguished;

several customer order preparation stations 10a to 10f, each occupied by an operator 1a to 1f and extending perpendicularly to the conveyors of the third sub-assembly referenced 8; and a management system (also called a "management unit") that is a computer-based central management system responsible for driving the entire automated storage system (warehouse, set of conveyors and preparing stations).

The management system also manages the list of customer orders associated with each shipping container (target load) and therefore the sequential order of the customer order lines forming this list, as a function of the location of the storage containers (source loads) in the warehouse, the availability of the trolleys and the elevators of the warehouse as well as the requirements in terms of items and goods of the different shipping containers to be prepared which succeed one and other at the preparing station. The purpose of this is to optimize all the movements and the preparation time for the shipping containers and ensure synchronization between the arrival, at the preparation station, of a shipping container and storage containers (containing goods indicated in the customer order list associated with this storage container).

In the example of FIG. 1, each preparing station comprises two conveyor circuits: a first conveyor circuit for the storage containers, formed by two horizontal columns of conveyors; one column (the outbound column 2) for moving these storage containers from the third sub-assembly of conveyors 8 up to the operator 1a and the other (the return column 3) for the reverse movement and a second circuit of conveyors for the shipping containers, formed by two horizontal columns of conveyors: one (outbound column 4) for moving the shipping containers from the third sub-assembly of conveyors 8 up to the operator 1a and the other (return column 5) for the reverse movement. In each of these first and second circuits, the outbound columns 2 and 4 (formed by classic horizontal conveyors) carry out the function of accumulating a determined quantity of containers upstream to the operator (or automaton).

A storage container makes the following journey: it is picked up by a trolley in the warehouse 7 then conveyed successively by the conveyors of the sub-assemblies 9, 6 and 8 and then by the conveyors of the outbound column 2 and then presented to the operator. In the other direction (after presentation to the operator), the storage container makes the reverse journey: it is conveyed by the conveyors of the return column 3 and then successively by the conveyors of the sub-assemblies 9, 6 and 8 and finally re-positioned in the warehouse 7 by a trolley.

As mentioned further above, the storage containers (source loads) have to be presented to the operator in a desired sequential order forming a determined sequence. This is the same for the shipping containers (target loads). In addition, the stream of storage containers must be synchronized with the stream of shipping containers.

In order to relax the constraints on the warehouse, it is accepted that the containers (storage containers or shipping containers) will not exit the warehouse in the desired sequential order (i.e. in the order in which they have to be presented to the operator). An operation therefore needs to be carried out for sequencing the containers between the warehouse and the preparing station where the operator is situated.

In the example of FIG. 1, this sequencing operation is performed by the second sub-assembly of conveyors 6 which itself fulfils the buffer role: the storage containers circulate therein in a loop and when the storage container awaited on the conveyors of the outbound column 2 comes before this column (in order to complete the sequence of storage containers awaited at the preparing station), this container is transferred to the conveyors of the outbound column 2, the other storage containers continuing to circulate on the second sub-assembly of conveyors 6. This method is performed for each of the storage containers awaited in the sequence (i.e. in the sequential order of arrival desired at the preparing station).

Classically, this sequential order (sequence) of arrival is pre-determined (i.e. it is determined for each container before this container reaches the preparation station) by the management system and, if necessary, recomputed during the carrying of the containers from the warehouse exit to the preparing station in which the operator is situated (for example take into account a malfunction in an element of the system).

In the example illustrated in FIG. 1, the return column for the shipping containers 5 is common to the preparation stations referenced 10a and 10b (these two adjacent stations are configured symmetrically to each other, the common column forming an axis of symmetry). This is also the case for the adjacent preparing stations referenced 10c and 10d as well as for those referenced 10e and 10f. This approach is aimed at reducing the footprint of the preparing stations.

Unfortunately, despite this clever approach, the current solution based on horizontal classic conveyors (as described here above with reference to FIG. 1) has several drawbacks.

First of all, it consumes to very large amount of m$^2$ for a small running surface height (750 mm typically). An example of this excessive footprint is the fact that the surface area needed for six order-preparing stations (as in the example of FIG. 1) is about 100 m$^2$.

Another drawback is that the density on the ground of classic horizontal conveyors in preparing stations is such that it makes it difficult to obtain maintenance access to these conveyors (the conveyor coverage area is too dense).

Another drawback is that, without further increasing the footprint of the preparing station (by increasing the length of the outbound column of each of the first and second circuits), it is not possible to increase the number of containers that can accumulate upstream to the operator (or automaton).

Yet another drawback is that, in certain configurations, the footprint of the preparing stations prevents maintenance access or makes it difficult to obtain maintenance access to the trolleys (also called shuttles) used in the warehouses. The maintenance of these trolleys sometimes then makes it necessary to access the warehouse by the rear, with a girder system (referenced 11 in FIG. 1) that is hardly ergonomic.

Yet another drawback is that it is not possible to achieve optimal processing when one and the same container has to be presented to the operator several times in succession. Indeed, at present, the sub-assembly of a conveyor referenced 6 is used to carry out an operation for re-introducing the given storage container into the outbound column 2 of the first preparing station circuit (10a for example). This is not optimal because the time slot between two successive instances of presentation of the same container to the operator cannot be short, and corresponds to the duration of travel by this container on the totality of the following circuit: conveyors of the return column 3 and then those of the sub-assembly of conveyor referenced 6, and finally those of the outbound column 2. In practice, if this time slot is too great, then two storage containers containing the (same) type of desired items are made to exit the warehouse. Then, the number of movements made by the warehouse is increased. This is not a satisfactory solution (because it generally leads to an increase in the number of alleys of the warehouse in order to avoid surpassing a maximum capacity of entries/exits that can be made by the elevator or elevators positioned at each end of an alley).

In order to overcome the above-mentioned drawbacks of the classic technique, a solution has been proposed in the patent EP2487123A1 (Savoye). It consists of the use of at least one chute in combination with at least one alternating elevator. The chute comprises superimposed mobile locations each capable of receiving and moving at least one load (container) downward. The chute forms a means of vertical accumulation and sequential distribution of loads preliminarily placed in the locations. The alternating elevator is capable of moving vertically along the chute up to each of its locations. For each given load that comes up, the managing system reads its identifier then selects one of the locations of the chute (depending on the identifier read and on a pre-determined sequence, defining the sequential order in which the loads must exit the chute in order to be presented to the preparing station) and finally steers the elevator in order to make the given load enter the selected location.

In being based on a vertical accumulation of loads, the prior-art solution described in EP2487123A1 has several advantages. In particular it:

reduces the footprint of the order preparing stations;
facilitates maintenance access to the elements included in the preparing station (the conveyor coverage area is not too dense);
increases the number of loads that can be accumulated, without negative impact on the footprint of the preparing station; and
facilitates maintenance access for the trolleys used in the warehouse.

In addition, the combined use of a path and alternating elevator enables the performance of a sequencing (i.e. a scheduling in the sense of placing the loads in a desired sequential order called a sequence). It may be recalled that the loads do not exit the warehouse in the desired order and have to be sequenced (scheduled) before being presented to the operator (or robot). The sequencing (scheduling) capacity is related to the quantity of loads that can be stored temporarily in the path.

The prior art solution of EP2487123A1 however has several drawbacks, especially:

it is limited in performance by the fact that it requires the use of one or more alternating elevators;
it is not a multi-format solution with respect to the chutes; and
it requires two distinct pieces of equipment (elevator and chute) used in combination to create sequences, and this increases its cost.

3. GOALS OF THE INVENTION

The invention in at least one embodiment is aimed especially at overcoming these different drawbacks of the prior art.

More specifically, it is a goal of at least one embodiment of the invention to provide a technique (a system and a method) for overcoming the drawbacks of the classic technique mentioned here above (see FIG. 1) while avoiding the drawbacks of the technique known from EP2487123A1.

4. SUMMARY OF THE INVENTION

One particular embodiment of the invention proposes a system of sequencing for at least one preparing station, configured to sequence loads coming from at least one external unit via at least one entering outbound conveyor and to provide said at least preparing station, via at least one exiting outbound conveyor, with at least one sequence comprising loads in a desired sequential order. The system comprises:

a managed elevator with nacelles (or buckets) circulating in a closed loop, called a paternoster, each nacelle enabling the transportation of at least one load and being equipped with a device for transferring loads on to or out of said nacelle;

at least one buffer location, configured to temporarily receive at least one load coming from the paternoster; and a managing unit configured to organize the movements of the loads in the system and process each load that comes to the entrance of the paternoster, through said at least one entering outbound conveyor according to one of the following modes, selected as a function of the place desired for said load in said at least one sequence;

(a) after introduction into the paternoster, the load undergoes a shortcut or bypass transfer between two nacelles positioned face to face, by implementation of the load transfer devices of the two nacelles, and is then presented to said at least one exiting outbound conveyor;

(b) after introduction into the paternoster, the load undergoes at least one buffer transfer towards a given buffer location and is then subsequently placed again in the paternoster and finally presented to said at least one exiting outbound conveyor;

(c) after introduction into the paternoster, the load is transported therein without shortcut or bypass transfer or buffer transfer and then presented to said at least one exiting outbound conveyor.

The general principle consists in carrying out a sequencing of loads (i.e. a scheduling, in the sense of placing the loads in a desired sequential order called a sequence) by making use, in a combined way and according to a wholly novel approach and inventive approach (without alternating elevator), of a paternoster (with at least one nacelle) and at least one buffer location under the control of a managing unit implementing three possible processing modes for each load that arrives to enter the paternoster.

The mode (a) can be seen to be a mechanism used to accelerate a given load (in the sense of making it rise in the current sequence, which is being modified to arrive at the desired sequence) that arrives to enter the paternoster and which is delayed relative to one or more other loads that have already arrived to enter the paternoster whereas they should be situated behind the given load in the desired sequence.

The mode (b) can be seen as a mechanism used to delay a given load (in the sense of bringing it back in the current sequence which is being modified so as to arrive at the desired sequence) that arrives to enter the paternoster and which is ahead of one or more other loads which have not yet arrived to enter the paternoster whereas they should be situated before the given load in the desired sequence.

The mode (c) can be seen as a mechanism used neither to accelerate nor delay (in the above-mentioned senses) a given load that arrives to enter the paternoster.

The sequencing (scheduling) capacity of the present system is related to the quantity of loads that can be stored temporarily in the paternoster (i.e. the number of nacelles of the paternoster) and the number of buffer locations.

The proposed solution has many advantages, especially but not exclusively:
  minimizing sequencing constraints at exit from the external unit (for example an automatic store) by a sequencing that is as close as possible to the preparing station;
  reducing the footprint;
  optimizing the size of the external unit (for example an automatic store) by pooling resources;
  optimizing the efficiency of the system;
  optimizing the responsiveness of the system;
  handling multi-format loads if the motor-driven roller-fitted nacelles are used;
  optimizing costs if the system comprises several preparing stations (pooling of the paternoster and of the buffer location or locations);
  etc.

According to one particular characteristic, in the mode b), the load undergoes, before or after the at least one buffer transfer, a bypass transfer between two nacelles of the paternoster positioned face to face.

In this way, the load reaches the given buffer location more speedily and therefore a nacelle location is released more speedily (this is useful for the sequencing of the other loads).

According to one particular characteristic, said at least one sequence belongs to the group comprising:
  sequences each comprising only source loads, each source load being a storage container of an item or items;
  sequences each comprising only target loads, each target load being a shipping container of an item or items; and
  sequences each comprising a target load that is a shipping container of an item or items, followed by at least one source load that is a storage container of an item or items.

In a first particular implementation, each nacelle comprises N locations that are horizontally adjacent, each possessing a rank ranging from 1 to N with N being greater than or equal to 2 and the system comprises:
  at least N entering outbound conveyors each configured to carry out transfers of loads towards one of the N location ranks, one distinct location rank being associated with each entering outbound conveyor; and
  for each preparing station, N horizontally adjacent exiting outbound conveyors, each configured to carry out transfers of loads coming from one of the N location ranks, one distinct location rank being associated with each exiting outbound conveyor.

In one example, one or more entering outbound conveyors can be pulled between several preparing stations. In another example, the system comprises a distinct set of N entering outbound conveyors for each preparing station. In this other example, the system therefore comprises, for each preparing station, N entering outbound conveyors (which enter the loads into the N nacelle locations) and N exiting outbound conveyors (which remove the loads leaving the N nacelle locations).

In a second particular implementation, each nacelle comprises N locations that are horizontally adjacent, each possessing a rank of 1 to N, with N greater than or equal to 2 and the system comprises at least one transfer table type device configured to make transfers of loads from said at least one entering outbound conveyor to any one of the N location ranks.

In this second particular implementation, each transfer table type device enables one entering outbound conveyor to be pooled between several ranks of nacelle locations.

According to one particular characteristic of this second implementation, said at least one transfer table type device is common to at least two horizontally adjacent entering outbound conveyors configured to carry out transfers of loads from any one of the at least two entering outbound conveyors to any one of the N location ranks.

Thus each transfer table type device is itself pooled between at least two entering outbound conveyors.

In a third particular implementation (which can be combined with the second implementation) each nacelle comprises N horizontally adjacent locations and each possesses a rank between 1 and N with N greater than or equal to 2 and the system comprises, at least for one given preparing station, at least one transfer table type device configured to make transfers of loads from any one of the N location ranks to said at least one exiting outbound conveyor configured to remove the loads intended for said given preparing station from the paternoster.

In this third particular implementation, each transfer type table device enables one exiting outbound conveyor to be pooled between several ranks of nacelle locations.

According to one particular characteristic of this third implementation, said at least one transfer table type device is common to at least two horizontally adjacent exiting outbound conveyors and is configured to make transfers of loads from any one of the N location ranks to any one of the at least two exiting outbound conveyors.

Thus, each transfer table type device is itself pooled between at least two exiting outbound conveyors.

In a fourth particular implementation, each nacelle comprises N horizontally adjacent locations, each possessing a rank ranging from 1 to N with N greater than or equal to 2, and the system comprises:

N horizontally adjacent exiting outbound conveyors, each configured to receive loads coming from one of the N location ranks, one distinct location rank being associated with each exiting outbound conveyor;

one common conveyor configured to receive the loads coming from the N exiting outbound conveyors;

N final outbound conveyors, each configured to receive loads coming from the common conveyor and take them to one of the N preparing stations;

and the managing unit is configured to organize the movements of the loads in the system as follows:

for each of the N ranks of nacelle locations, sequencing of loads according one sequence among N sequences and supplying sequenced loads to the exiting outbound conveyor associated with said nacelle location rank;

transfer from the N exiting outbound conveyors to the common conveyor of the loads forming the N sequences;

for each of the N sequences, transfer of the loads forming said sequence from the common conveyor to one of the N final outbound conveyors.

In this way, the paternoster and the N (horizontally adjacent) exiting outbound conveyors are pooled between several preparing stations.

It will be noted that, in the first and third implementations mentioned here above, the paternoster is pooled between several preparing stations. By contrast, each preparing station is associated with a set of one or more exiting outbound conveyors that are specific to it and that are horizontally adjacent. Hence, each set of one or more exiting outbound conveyors is placed at a distinct vertical level, among all the vertical exit levels of the paternoster (i.e. all the vertical exit positions at which the nacelles come to a stop for a load exit).

In a fifth particular implementation, each nacelle comprises a single location and the system comprises at least one transfer table type device configured to make transfers of loads from any one of the at least two horizontally adjacent entering outbound conveyors towards the single location of said nacelles.

Thus, the paternoster is simples (only one location per nacelle). Each transfer table type device enables the use of several horizontally adjacent entering outbound conveyors.

In a sixth particular implementation (which can be combined with the fifth implementation), each nacelle has a unique location and the system comprises, at least for one given preparing station, at least one transfer table type device configured to make transfers of loads from the unique location of said nacelles towards any one of the at least two exiting outbound conveyors that are horizontally adjacent and configured to remove the loads intended for said given preparing station from the paternoster.

Thus, each transfer table type device enables the use of several horizontally adjacent exiting outbound conveyors.

According to one particular characteristic, the managing unit is configured for the processing, in one of the following modes, of each load that comes up, via an entering return conveyor, to the entrance of the paternoster, after having been processed by said at least one preparing station:

(d) if the load is still necessary, within a first time period, obtaining said at least one sequence: after introduction into the paternoster, the load undergoes at least one buffer transfer to a given buffer location and is then subsequently re-positioned in the paternoster and finally presented to said at least one exiting outbound conveyor;

(e) if the load is still necessary, in a second time period smaller than the first time period, for obtaining said at least one sequence: after introduction into the paternoster, the load is kept in the paternoster until it is presented to said at least one exiting outbound conveyor.

(f) if the load is still necessary, in a third time period smaller than the second time period, for obtaining said at least one sequence: after introduction into the paternoster, the load undergoes a bypass transfer between two nacelles situated face to face, and is then presented to said at least one exit outgoing conveyor;

(g) if the load is no longer necessary, for obtaining said at least one sequence: the load is introduced into the paternoster, then conveyed to said at least one exiting return conveyor.

Thus, the system also enables the optimal management of the return of the loads that come to the entrance of the paternoster after having been processed by the preparing station or stations. The modes (d), (e) and (f) enable a source load or a target load to be kept as close as possible to the preparing station, pending their subsequent use. Thus, the entry/exit movements into and out of the external unit (for example an automatic store) are minimized. The mode (e) enables a load to be presented again (at the same preparing station or at another one) more speedily than with the mode (d). The mode (f) enables a load to be presented again (at the same preparing station or at another) more speedily than with the mode (e). The mode (g) enables the return of the loads into the external unit.

According to one particular characteristic, in the mode (g), after introduction into the paternoster, the load undergoes a bypass transfer between two nacelles positioned face to face.

In this way, a location of the nacelle is released more speedily.

According to one particular characteristic, in the mode (d), before or after the at least one buffer transfer, the load undergoes a bypass transfer between two nacelles positioned face to face.

In this way, a nacelle location is released more speedily.

Another embodiment of the invention proposes a method for the sequencing of loads coming from at least one external unit through at least one entering outbound conveyor and for providing at least one preparing station, through at least one exiting outbound conveyor, with at least one sequence comprising loads in a desired sequential order, said method being implemented in a system comprising a managed or steered elevator with nacelles, called a paternoster, circulating in a closed loop, each nacelle enabling the transportation of at least one load and being equipped with a device for transferring loads on to or out of said nacelle; at least one buffer location, configured to temporarily receive at least one load coming from the paternoster and a managing unit. The managing unit organizes the movements of the loads in the system and processes each load that comes to the entrance of the paternoster through said at least one entering outbound conveyor, according to one of the modes (a), (b) and (c) mentioned here above, selected according to the place desired for said load in said at least one sequence.

5. LIST OF FIGURES

Figure 4A:
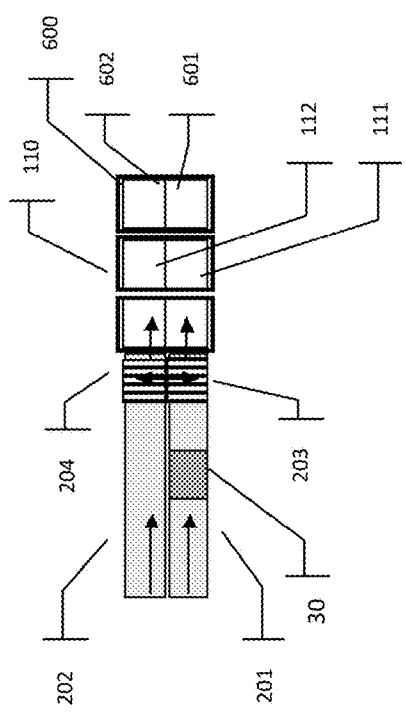
Figure 4B:
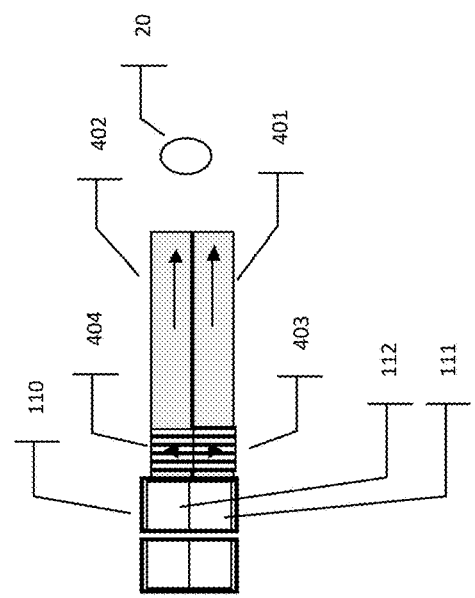
Figure 7A:
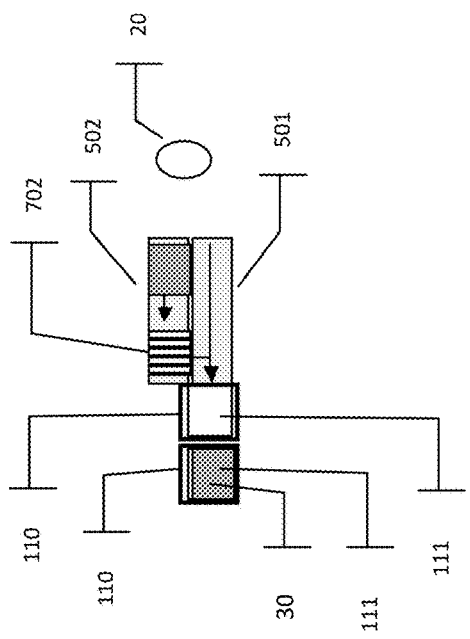
Figure 7B:
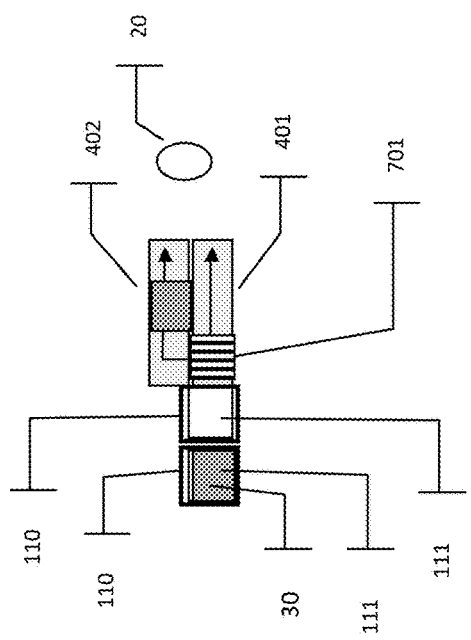
Figure 7C:
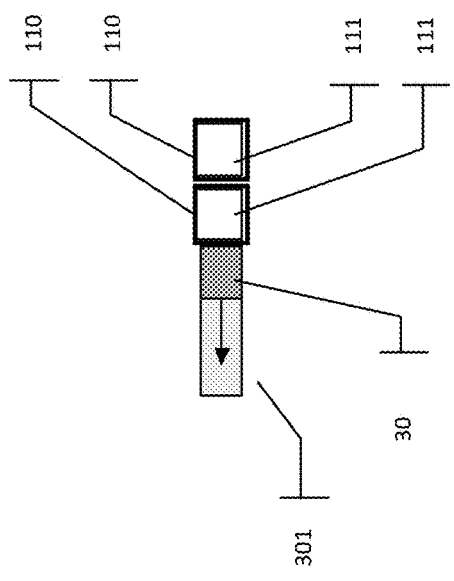
Figure 7D:
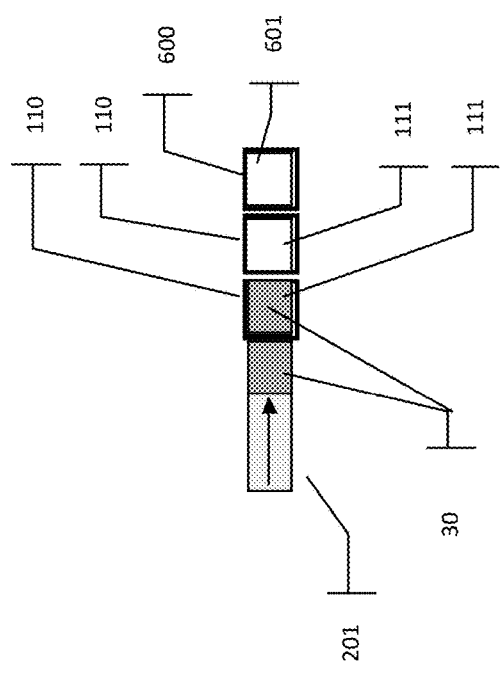
Figure 8:
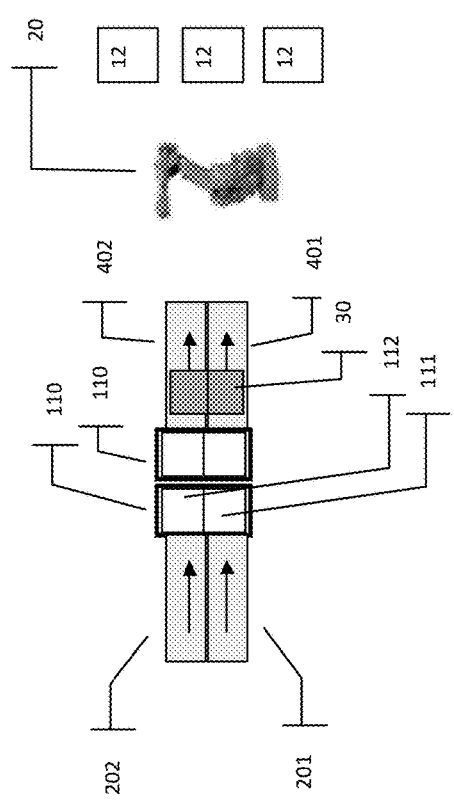
Figure 9:
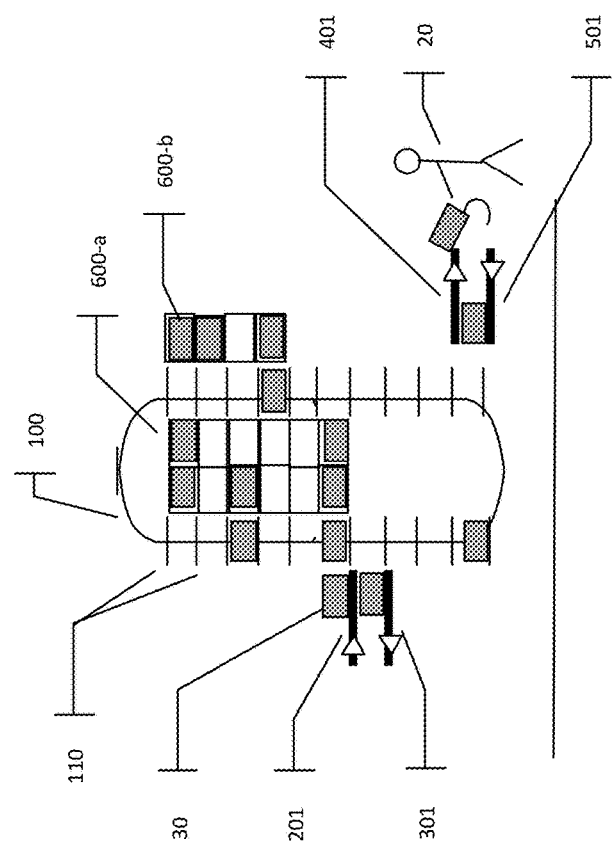
Figure 10:
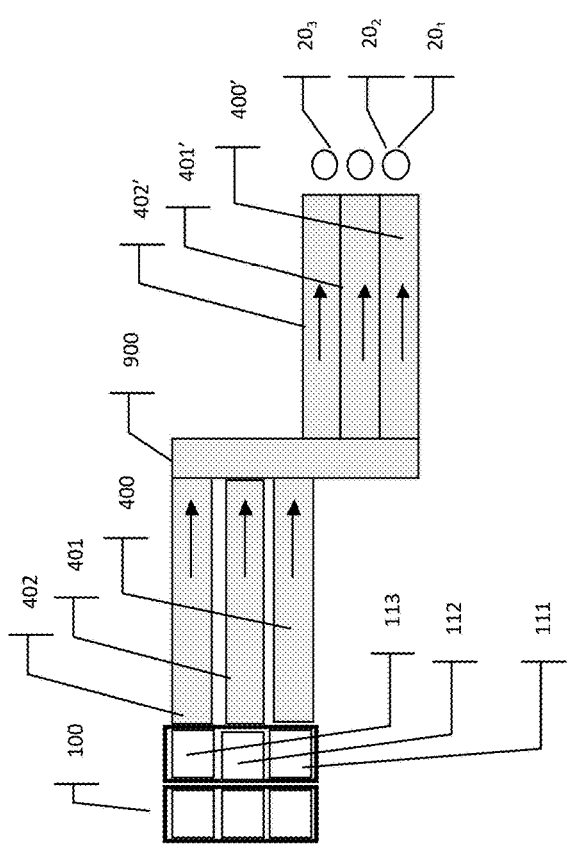
Figure 11:
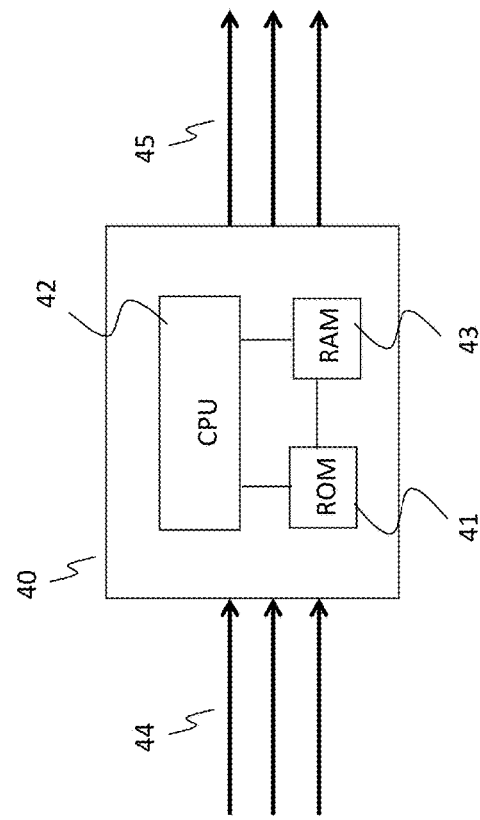

Other features and advantages of the invention shall appear from the following description, given by way an indicative and non-exhaustive example, and from the appended drawings of which:

FIG. 1 already described with reference to the prior art, presents a top view of an automated storage system;

FIG. 2 presents a side view of a system according to a first embodiment of the invention;

FIGS. 3A, 3B, 3C and 3D present different views in section (along A-A', B-B', C-C' and D-D' respectively) of the system of FIG. 2;

FIGS. 4A and 4B present different views in section (along D-D' and B-B' respectively) of a system according a first variant of implementation of the first embodiment of the invention;

FIG. 5 presents a side view of a system according to a second variant of implementation of the first embodiment of the invention;

FIG. 6 presents a side view of a system according to a third variant of implementation of the first embodiment of the invention;

FIGS. 7A, 7B, 7C and 7D present different views in section (along A-A', B-B', C-C' and D-D' respectively) of a system according to a second embodiment of the invention;

FIG. 8 presents a top view of a system according to a third embodiment of the invention;

FIG. 9 presents a side view of a system according to a fourth variant of implementation of the first embodiment of the invention;

FIG. 10 presents a top view of a system according to a fourth embodiment of the invention; and FIG. 11 presents an example of a structure of a steering or managing unit according to one particular embodiment of the invention.

6. DETAILED DESCRIPTION

In all the figures of the present document, the identical elements are designated by a same numerical reference.

FIG. 2 (side view) and FIGS. 3A, 3B, 3C and 3D (views in section along A-A', B-B', C-C' and D-D' respectively) illustrate a system according to a first embodiment of the invention, for sequencing source loads and target loads in order to feed a 1-for-1 type preparing station (i.e. a station in which an item is picked from a source load (source container) and deposited in a target load (target container)).

In this first embodiment, the system is positioned between an external unit (not shown) for example an automatic storage depot, and a preparation unit 20 manned by an operator 21. The system provides the preparing station 20 on the one hand with a sequence of source loads and on the other hand with a sequence of target loads, each sequence complying with a given order.

The system comprises a paternoster 100, i.e. a managed lift provided with a set of nacelles 110 circulating in a closed loop. Each nacelle 110 enables the transportation, on two horizontally adjacent locations (or positions) 111 and 112, of two loads 30 (for example of the tub, cardboard box, tray or other type) positioned beside one another.

The nacelle is equipped with a load-transfer device that is used:
  either alone (first case): each location 111 and 112 of the nacelle is for example equipped with a motor-driven conveyor section (forming said transfer device) enabling a load 30 to be transferred to the nacelle or outside it;
  or in cooperation with means external to the nacelle (second case): in one variant, each location 111 and 112 of the nacelle is equipped with idler rollers (forming said transfer device), which are put into motion for example by collapsible mechanical driving means positioned at the end of each conveyor or buffer location. Other means of putting into motion can be envisaged. The idler rollers of each nacelle are, for example, fixedly attached in rotation by round belts that link them in sets of two in a quincunxial arrangement.

The nacelles 110 of the paternoster 100 circulate in step-by-step mode and in a closed loop. They come to a controlled stop before (i.e. in front of) a set of vertical transfer positions. When a nacelle occupies one of these transfer positions, the system enables a transfer of loads between each location of the nacelle and a device (conveyor or buffer location) facing this location of the nacelle.

In addition, when two nacelles 110 are aligned horizontally, either of the loads or both loads can be transferred from nacelle to the other (by implementation of the load transfer devices of the two nacelles) in order to rapidly convey the loads from the other side of the loop formed by the paternoster, as in a shortcut (or bypass) and this can be done without having to wait for the rotation of the entire unit. Thus, should each location of the nacelle be equipped with a motor-driven conveyor section (first case mentioned here above), the bypass transfer of loads between two nacelles is done simply through the motor-driven conveyor section of each of the two nacelles. In the second case mentioned here above, where each location of the nacelle is equipped with idler rollers, the bypass transfer of loads between two nacelles is done through at least one collapsible mechanical driving means, that comes into contact with each nacelle. The rotation of this at least one driving means is then transmitted to the idler rollers of the two nacelles, with a same sense of rotation to carry out the transfer. In one particular embodiment (said to be pooled), a same driving means is used for the two horizontally aligned nacelles.

The following paragraphs present different pieces of equipment (of the conveyor or buffer location type) included in the system and interfacing with the paternoster and its nacelles, when these nacelles come to a controlled stop before the above-mentioned transfer positions.

A first set of two entering outbound conveyors 201 and 202 enables the loads 30 to be conveyed to the entry of the paternoster 100. For example, the one referenced 201 conveys the source loads (i.e. typically loads that are containers of items or goods to be picked) and the one referenced 202 enables the conveyance of target loads (i.e. typically loads that are to contain orders to be prepared). The reverse configuration is also possible (in this case the entering outbound conveyor referenced 201 enables the conveyance of the target loads when the entering outbound conveyor referenced 202 enables the conveyance of the source loads. The conveyor referenced 201 interfaces with the location 111 of the nacelles and the one referenced 202 interfaces with the location 112 of the nacelles.

A second set of two exiting outbound conveyors 401 and 402 enables the conveyance and accumulation of the loads 30 at the exit from the paternoster 100 and in the direction of the preparing station 20. For example, the conveyor referenced 401 enables conveyance of the source loads to be used to the preparing station 20; the conveyor reference 402 enables conveyance of the target loads to be used to this same preparing station. The reverse configuration is also possible.

A third set of two entering return conveyors 501 and 502 enables the loads 30 to be removed towards the paternoster 100 after processing at the preparing station 20. For example, the conveyor referenced 501 enables the source loads to be removed and the conveyor referenced 502 enables the target loads to be removed. The reverse configuration is also possible.

A fourth set of two exiting return conveyors 301 and 302 enables the removal of the loads 30 at the exit from the paternoster 100 towards the external unit (not shown). For example, the conveyor referenced 301 enables the removal of the source loads and the conveyor referenced 302 enables the removal of the target loads. The reverse configuration is also possible. The conveyor referenced 301 interfaces with the location 111 of the nacelles and the conveyor reference 302 interfaces with the location 112 of the nacelles.

In addition, buffer locations 600, used to temporarily store the loads 30, are situated so as to be facing stop positions of the nacelles (vertical transfer positions), at all levels or not at all levels. These buffer locations are for example situated outside the loop closed by the paternoster 100. Certain buffer locations 600 are of single depth and enable two loads 30 to be disposed at two positions 601 and 602, one beside the other. Other buffer location 600 can be of multiple depth, in particular of double depth (with two front positions 601 and 602 and two rear positions 601' and 602'). Each of the positions 601 and 602, 601' and 602' of a buffer location 600 is for example equipped with a device enabling the transfer of a load 30 to said position or outside it, in making this transfer from or towards a nacelle of the paternoster 100. This arrangement is for example a motor-driven conveyor section. For example, the positions 601 and 601' are intended to receive source loads and the positions 602 and 602' are intended to receive target loads.

The system also comprises a managing unit 40 that enables the optimal organizing of the movements of the loads in the system, and especially on the paternoster, the conveyors and in the buffer locations in order to make source loads available according to a first sequence on the exiting outbound conveyor 401 and target loads available according to a second sequence on the exiting outbound conveyor 402.

To this end, the managing unit 40 receives pieces of information read (especially a load identifier), on the loads passing at different places of the system, by reading devices (not shown) of the barcode reader type, RFID label reader type etc. These places are for example situated at the ends of the different conveyors.

When a load accumulated on one of the entering outbound conveyors 201 or 202 arrives at entry of the paternoster 100, the managing unit 40 determines the destination of the load according to the time frame of use or of the processing of this load at the preparing station 20.

More specifically, the managing unit is configured to process each load that comes to the entry of the paternoster through one of the entering outbound conveyors according to one of the modes (a), (b) and (c) described in detail here below, selected according to the place desired for said load in said sequence.

Mode (a) (or first outbound mode): after introduction into the paternoster 100, the load 30 undergoes a bypass transfer between two nacelles 110 positioned so as to be facing each other and is then presented to one of the exiting outbound conveyors 401 (for a source load) or 402 (for a target load). The mode (a) is the mode that enables the speediest conveyance of an entering load up to the preparing station. Indeed, through the bypass between two nacelles, this mode enables the load to very rapidly reach the opposite side of the paternoster. It is adapted for a load which, according to the sequence to be obtained (i.e. the desired order of arrival at the preparing station), has to be presented within a very short-term time frame. The bypass transfer modifies the sequential order of the loads so that the desired order is achieved since a load benefiting from this bypass transfer will be presented to the preparing station prior to certain loads already present in the paternoster (loads present in nacelles situated before the nacelle receiving the load during the bypass transfer (i.e. "before" in taking the sense of travel in the closed loop by the nacelles of the paternoster)). This mode (a) can be seen as a mechanism used to accelerate a given load which comes to the entrance to the paternoster later than one or more other loads which have already come to the entrance of the paternoster whereas they should be situated behind the given load in the desired sequence.

Mode (b) (or second outbound mode): after introduction into the paternoster 100, the load 30 undergoes at least one buffer transfer towards a given buffer location 600 and is then subsequently replaced in the paternoster 100 and finally presented to one of the exiting outbound conveyors 401 and 402. Carrying out several buffer transfers for one and the same load enables, for example, this load to be brought as close as possible to the preparing station while at the same time keeping it in the buffer zone (i.e. in one of the buffer locations) and while at the same time building the desired sequence as and when the operation moves forward. Optionally, before or after the at least one buffer transfer, the load undergoes a bypass transfer between two nacelles of the paternoster positioned face to face. The mode (b) is the mode enabling the least rapid conveyance of an entering load up to the preparing station. Indeed, through the buffer transfer (towards a buffer location), this mode delays the instant when the load will be presented to the preparing station. It is adapted for a load which, according to the sequence to be carried out (i.e. the desired order of arrival at the preparing station) has to be presented within a relatively lengthy time period. The buffer transfer modifies the sequential order of the loads to obtain the desired order since a load benefiting from this buffer transfer will be presented to the preparing station after certain loads not yet present in the paternoster.

This mode (b) can be seen as a mechanism used to delay a given load that comes to the entrance of the paternoster ahead of time when compared with one or more other loads which have not come up to the entry of the paternoster whereas they should be situated before the given load in the desired sequence.

In the mode (b), the managing unit determines the level and the position (forward position 601 or 602 or rear position 601' or 602') of the buffer location 600 so as to organize the sequential order in which the loads will be taken back on to the nacelle while minimizing future movements of the paternoster. In the configuration where the buffer locations 600 are situated outside the loop formed by the elevator 100, these locations being therefore managed in LIFO (last in, first out) mode, the managing unit also manages the constraint of accessibility to the load for subsequent sequencing.

Mode (c) (or third outbound mode): introduction into the paternoster 100, the load 30 is transported therein "normally", i.e. without bypass transfer or buffer transfer and then presented to one of the exiting outbound conveyors 401 or 402. The mode (c) can be seen as a mechanism enabling neither acceleration nor delay (as understood here above) of a given load which arrives at the entry of the paternoster. This given load undergoes "normal" transfer in the sense that it enters the paternoster and exits from it when the nacelle in which it is placed is situated before one of the exiting outbound conveyors 401 (for a source load) or 402 (for a target load) (after having passed through a portion of the closed loop of the paternoster.

Similarly, after processing (use) of a load 30 at the preparing station 20, the managing unit conveys the loads which arrive through one of the entering return conveyors 501 (for the source loads) or 502 (for the target loads) at input of the paternoster 100 and does so according to the requests and needs that still remain for these loads.

More specifically, the managing unit is configured to process each load (source load or target load) coming to the entrance of the paternoster via one of the entering return conveyors 501 (for a source load) or 502 (for a target load) according to one of the modes (d), (e), (f) and (g) described in detail here below.

Mode (d) (or first return mode): if the load 30 is still necessary (at another rank of the sequence) within a first time period, to obtain the desired sequence, then after introduction into the paternoster, the load undergoes at least one buffer transfer to a given buffer location and is then subsequently re-positioned in the paternoster and finally presented to one of the exiting outbound conveyors 401 (for a source load) or 402 (for a target load). Optionally, in the mode (d), the load, before or after the at least one buffer transfer, undergoes a bypass transfer between two nacelles positioned face to face.

Mode (e) (or second return mode): if the load 30 is still needed (at another rank of the sequence), in the second time period smaller than the first time period, to obtain the desired sequence, then after introduction into the paternoster, the load is kept therein until it is presented to one of the exiting outbound conveyors 401 (for a source load) or 402 (for a target load). Optionally, in the mode (e), the load, before being presented to said at least one exiting outbound conveyor 401 or 402, undergoes a bypass transfer between two nacelles positioned face to face.

Mode (f) (or third return mode): if the load 30 is still needed (at another rank of the sequence), in a third time period smaller than second time period, to obtain the desired sequence then after introduction into the paternoster, the load undergoes a bypass transfer between two nacelles positioned face to face, and is then presented to one of the exiting outbound conveyors 401 (for a source load) or 402 (for a target load).

Mode (g) (or fourth return mode): if it is no longer necessary to carry out the desired sequence, the load is introduced into the paternoster, then conveyed to one of the exiting return conveyors 301 (for a source load) or 302 (for a target load) and finally towards the external unit (warehouse for example). Optionally, in the mode (g), the load, after introduction into the paternoster, undergoes a bypass transfer between two nacelles positioned face to face.

FIGS. 4A and 4B illustrate a first variant of the first embodiment of the invention, a variant in which the locations 111 and 112 of the nacelles are generalized and can equally well accept source loads and target loads. It is also possible to place two loads of a same type on the locations 111 and 112 of a same nacelle 110 (either two source loads or two target loads).

To this end, a transfer table type device 203, 204 enables a load 30 to be directed towards the location 111 or the location 112 of a nacelle and to do so whatever the originating conveyor (among the two entering outbound conveyors 201 and 202). According to this principle, a load 30 present on the entering outbound 201 can be directed towards the location 111 or the location 112 of a nacelle. In the same way, a load 30 present on the entering outbound conveyor 202 can be directed towards the location 112 or the location 111 of a nacelle.

In this same first variant, the implementing of a transfer table type device 403, 404 enables a load 30 to be directed towards the exiting outbound conveyor 401 or towards the exiting outbound conveyor 402 (to be conveyed up to the preparing station 20) and this can be done whatever the location 111 or 112 of origin of the load on a nacelle.

This first variant favors the optimizing of the occupation of the nacelles, enabling the two loads to be loaded whatever their type (source or target). It also enables the dynamic reversal of the allotting of the exit outgoing conveyors 401 and 402 to the type of load, whether source or target. Thus, depending on the configuration, or more particularly if the picker or preparer is left-handed, then the conveyor 401 could be allotted to the distribution of target loads and the conveyor 402 for its part could be allotted to the distribution of the source loads; i.e. applying the reverse of the default configuration.

For the outbound route of a load, FIG. 4A illustrates the implementing of a transfer table type device 203, 204 common to both entering outbound conveyors 201 and 202 and FIG. 2 illustrates the implementing of a transfer table type device 403, 404 common to both exiting outbound conveyors 401 and 402. This principle can also be applied to the return route of a load with implementation of a transfer table type device (not shown) common to the two entering return conveyors 501 and 502 and the implementing of a transfer table type device (not shown) common to the two exiting return conveyors 301 and 302.

FIG. 5 illustrates a second variant of the first embodiment of the invention, a variant in which the paternoster 100 for its part feeds two preparing stations 20 and 20' situated at different heights. Each preparing station has its own exiting outbound conveyors 401, 402 and 401', 402' (horizontally adjacent at a given level) and in its own entering return conveyors 501, 502 or 501', 502' (horizontally adjacent at another given level) interfacing with the paternoster 100.

FIG. 6 illustrates a third variant of the first embodiment of the invention, a variant in which the picker station 20 is equipped with a robotic device 22 used to pick an item in the source load (conveyed for example by the exiting outbound conveyor 401) and deposited in the target load (conveyed for example by the exiting outbound conveyor 402).

A second embodiment of the invention is illustrated in FIG. 2 with reference to FIGS. 7A, 7B, 7C and 7D (seen in section along A-A', B-B', C-C' and D-D' respectively).

As in the first embodiment, the second embodiment enables the sequencing of the source loads and target loads to feed one or more preparing stations 20 of the 1-for-1 type. These preparing stations 20 can be manual, i.e. operated by a preparer or picker or they can be robotic. By contrast, and contrary to the first embodiment, this second embodiment implements a paternoster 100 with nacelles 110 at a single location 111.

A single entering outbound conveyor 201 is used to convey the source loads and target loads 30 to the entry of the paternoster 100. In one variant (not shown) a set of two entering outbound conveyors 201 and 202 is used to convey the source and target loads 30, and a transfer table type device is used to direct each of these loads 30 towards the unique location 111 of a nacelle and this is done whatever the originating conveyor (among the two entering outbound conveyors 201 and 202).

A single exiting return conveyor 301 is used to remove the source and target loads 30 at exit from the paternoster 100. It also interfaces with the single location 111 of the nacelles 110. In one variant (not shown) a transfer table type device is used to direct each of the loads 30 exiting from the single location 111 of a nacelle towards any one of the two exiting return conveyors 301 and 302.

A set of two exiting outbound conveyors 401 and 402 conveys and accumulates the loads 30 coming from the paternoster 100 and being sent to the picker station 20. For example, the exiting outbound conveyor 401 conveys the source loads to be used to the preparing station 20, and the exiting outbound conveyor 402 conveys the target loads to be used to this same preparing station. The source and target loads 30 are transferred from the nacelle 110 at the entrance to the exiting outbound conveyor 401. By means of a transfer table type device 701, the target loads are oriented on the exiting outbound conveyor 402 while the source loads are not rerouted.

According to an equivalent principle, a set of two entering return conveyors 501 and 502 is used to remove the source and target loads 30 towards the paternoster 100, after processing at the preparing station 20. For example, the entering return conveyor 501 removes the source loads and the entering return conveyor 502 removes the target loads. By means of a transfer table type device 702, the target loads coming from the entering return conveyor 502 are reintroduced into the entering return conveyor 501. Only the entering return conveyor 501 interfaces with the nacelles 110 of the paternoster 100.

In addition, the buffer locations 600 enabling the temporary storage of the loads 30 are situated facing stop positions of the nacelles (vertical transfer positions) on all the levels or on none of the levels. These buffer locations are for example situated outside the loop made by the paternoster 100. These buffer locations 600 are single-depth locations and enable a load 30 to be disposed on one position 601. Other buffer locations 600 can be multiple-depth locations, especially double-depth locations (with a front position 601 and a rear position 601').

The major management principles of the first embodiment (implemented by the managing unit) can be applied to the second mode while taking account of the particular feature of the configuration related to the use of nacelles with single location.

In a third embodiment of the invention, the system comprises a paternoster 100 with nacelles 110 having two locations 111 and 112, that enable the sequencing only of the source loads (i.e. type of container: package, tub, cardboard box, tray etc.). The target loads are situated and managed outside the present system. In other words, in this third embodiment and contrary to the first embodiment, the set of outbound conveyors (201, 202 and 401, 402) and return conveyors (301, 302 and 501, 502) as well as the set of buffer locations 600 are intended for the management of source loads.

The principles described for the first embodiment of the invention can be applied to this third embodiment.

It must be noted that, in certain cases of use, the source load is picked in its current state, at the preparing station 20, and then deposited on or in a target load. As a consequence, the reinsertion of the source load into the system does not have to take place and the return conveyors (501, 502 and 301, 302) are not necessary. This case corresponds for example to the sequencing of packages (source loads) before palletization.

In other cases, an element of the source load is picked and then deposited on or in a target load. The reinsertion of the source load therefore has to be managed through the return conveyors (501, 502 and 301, 302). This case corresponds for example to the sequencing of packages placed on trays, the trays being the source loads.

FIG. 8 is a top view of an example of implementation of this third embodiment of the invention in the context of a palletizing station 20. The palletizing station 20 is used to constitute one or more target loads 12 (for example of the pallet, roll or equivalent type) for source loads 30 (for example of the package, pack, basket or similar type). As the case may be, the palletization station is used to constitute either one target load (pallet) 12 at a time or several target loads simultaneously. The palletization station 20 can be operated manually, or be partially automated, or be robotic or be operated by any other principle. In the example illustrated in FIG. 8, the palletization station 20 is robotic and used to constitute several target loads 12 (in this case 12 pallets) using source loads 30 distributed sequentially to the preparing station via the exiting outbound conveyors 401 and 402.

FIG. 9 illustrates a fourth variant of the first embodiment of the invention, in which a part of the buffer locations 600 (note 600-*a* in FIG. 9) is situated inside the closed loop described by the circuits of the nacelles 110 and the other part of the buffer locations 600 (note 600-*b*) is situated outside the same loop, along with the different conveyors (201, 202, 301, 302, 401, 402, 501, 502). The locations of the parts 600-*a* and 600-*b* can be single-depth or the multi-depth locations depending on need.

The principle in which at least a part of the buffer locations are placed inside the closed loop described by the circuit of the nacelles can be implemented irrespectively of the embodiment of the invention.

A fourth embodiment of the invention is illustrated by FIG. 10, wherein the system feeds N preparing stations $20_1$, $20_2$ and $20_3$ (N=3 in the example illustrated) with sequences of loads each comprising one target load followed by one or more source loads (the source loads being sequenced or not sequenced with each other).

The paternoster 100 has nacelles 110 with N locations 111, 112 and 113.

The system comprises N horizontally adjacent exiting outbound conveyors 400, 401 and 402, each configured to receive loads coming from the nacelles (the exiting outbound conveyor referenced 400 is associated with the location of the nacelle 111, the conveyor referenced 401 is associated with the nacelle location 112 and the conveyor referenced 402 is associated with the nacelle location 113).

The system also has a common conveyor 900 configured to receive loads coming from the N exiting outbound conveyors 400, 401 and 402, and N final outbound conveyors 400', 401' and 402', each configured to receive loads coming from the common conveyor 900 and convey them to one of the preparing stations $20_1$, $20_2$ and $20_3$.

The managing unit 40 is configured to organize the movements of the loads in the system as follows:
  conveying loads on each of the N exiting outbound conveyors 400, 401 and 402 according to a distinct sequence (there are therefore N sequences in all). For example, the loads arriving on the conveyor 400 via the location 110 of successive nacelles form a first sequence intended for the preparing station 201; the loads reaching the conveyor 401, via the location 112 of successive nacelles form a second sequence intended for the preparing station $20_2$; the loads reaching the conveyor 402 via the location 113 of successive nacelles form a third sequence intended for the preparing station 203;
  transferring the loads forming the N sequences from the N exiting outbound conveyors 400, 401 and 402 towards the common conveyor 900;
  for each of the N sequences, transferring the load forming the sequence from the common conveyor 900 towards one of the N final outbound conveyors 400', 401' and 402'. For example, the loads forming the first sequence (intended for the preparing station $20_1$) are transferred to the final outbound conveyor 400'; the loads forming the second sequence (intended for the preparing station $20_2$) are transferred to the final outbound conveyor 401'; the loads forming the third sequence (intended for the preparing station $20_3$) are transferred to the final outbound conveyor 402'.

If the N final outgoing conveyors 400', 401' and 402' are generalized (i.e. if each of them is not associated with a distinct location rank), then each outbound final conveyor can receive successive sequences which do not all come from the same exiting outbound conveyor 400, 401 and 402.

FIG. 11 shows an example of a structure of the above-mentioned driving unit 40 according to one particular embodiment of the invention. The driving unit 40 comprises a random-access memory 43 (for example a RAM), a processing unit 42, equipped for example with a processor and driven by a computer program stored in a read-only memory 41 (for example a ROM or a hard disc drive). At initialization, the code instructions of the computer program are for example loaded into the random-access memory 43 and then executed by the processor of the processing unit 42. The processing unit 42 inputs signals 44, processes them and generates output signals 45.

The input signals 44 comprise various pieces of information on the working of the system, especially the load identifiers read (by reading devices of the barcode reader, RFID label reader or other types) on the loads when they pass by different places of the system (for example at the extremities of the different conveyors).

The output signals 45 include several pieces of control information for the managing (control) of the apparatuses of the system (especially the paternoster, the conveyors, the transfer table type devices and the buffer locations) in order to manage the motion of loads within the system.

This FIG. 11 illustrates only one particular implementation among several possible implementations. Indeed, the managing unit 40 can equally well be formed or made on a re-programmable computation machine (a PC computer, a DSI processor or a microcontroller) executing a program comprising a sequence of instructions, or on a dedicated computation machine (for example a set of logic gates such as an FPGA or an ASIC or any other hardware module). In this case, when the managing unit is implanted on a re-programmable computing machine, the corresponding program (i.e. the sequence of instructions) could be stored in a detachable storage medium (for example a floppy disk, a CD-ROM or a DVD-ROM) or not, the storage medium being partially or totally readable via a computer or a processor.

The invention claimed is:

1. A system of sequencing for at least one preparing station, configured to sequence loads coming from at least one external unit via at least one entering outbound conveyor and to provide said at least preparing station, via at least one exiting outbound conveyor with at least one sequence comprising loads in a desired sequential order, wherein the system comprises:
  a managed elevator with nacelles circulating in a closed loop, called a paternoster, each nacelle enabling the transportation of at least one load and being equipped with a device for transferring loads on to or out of said nacelle;
  at least one buffer location, configured to temporarily receive at least one load coming from the paternoster; and
  a managing unit configured to organize the movements of the loads in the system and process each load that comes to the entrance of the paternoster, through said at least one entering outbound conveyor according to the following modes, one of which is selected as a function of a place desired for said load in said at least one sequence:
    (a) after introduction into the paternoster, the load undergoes a bypass transfer between two nacelles positioned face to face, by implementation of the load transfer devices of the two nacelles, and is then presented to said at least one exiting outbound conveyor;
    (b) after introduction into the paternoster, the load undergoes at least one buffer transfer towards a given buffer location and is then subsequently re-positioned in the paternoster and finally presented to said at least one exiting outbound conveyor;
    (c) after introduction into the paternoster, the load is transported therein without bypass transfer or buffer transfer and then presented to said at least one exiting outbound conveyor.

2. The system according to claim 1 wherein, in the mode b), the load undergoes, before or after the at least one buffer transfer, a bypass transfer between two nacelles of the paternoster positioned face to face.

3. The system according to claim 1, wherein said at least one sequence belongs to the group consisting of:
  sequences each comprising only source loads, each source load being a storage container of an item or items;
  sequences each comprising only target loads, each target load being a shipping container of an item or items; and sequences each comprising a target load that is a shipping container of an item or items, followed by at least one source load that is a storage container of an item or items.

4. The system according to claim 1, wherein each nacelle comprises N horizontally adjacent locations, each possessing a rank ranging from 1 to N with N being greater than or equal to 2 and the system comprises:
at least N entering outbound conveyors each configured to carry out transfers of loads towards one of the N location ranks, one distinct location rank being associated with each entering outbound conveyor; and
for each preparing station, N horizontally adjacent exiting outbound conveyors, each configured to carry out transfers of loads coming from one of the N location ranks, one distinct location rank being associated with each exiting outbound conveyor.

5. The system according to claim 1, wherein each nacelle comprises N horizontally adjacent locations and each possesses a rank of 1 to N, with N greater than or equal to 2 and the system comprises at least one transfer table type device configured to make transfers of loads from said at least one entering outbound conveyor to any one of the N location ranks.

6. The system according to claim 5, wherein said at least one transfer table type device is common to at least two horizontally adjacent entering outbound conveyors configured to carry out transfers of loads from any one of the at least two entering outbound conveyors to any one of the N location ranks.

7. The system according to claim 1, wherein each nacelle comprises N horizontally adjacent locations, each possessing a rank between 1 and N with N greater than or equal to 2 and the system comprises, at least for one given preparing station, at least one transfer table type device configured to make transfers of loads from any one of the N location ranks to said at least one exiting outbound conveyor configured to remove the loads intended for said given preparing station from the paternoster.

8. The system according to claim 7, wherein said at least one transfer table type device is common to at least two horizontally adjacent exiting outbound conveyors and is configured to make transfers of loads from any one of the N location ranks to any one of the at least two exiting outbound conveyors.

9. The system according to claim 1, wherein each nacelle comprises N horizontally adjacent locations, each possessing a rank ranging from 1 to N with N greater than or equal to 2, and the system comprises:
N horizontally adjacent exiting outbound conveyors, each configured to receive loads coming from one of the N location ranks, one distinct location rank being associated with each exiting outbound conveyor;
one common conveyor configured to receive the loads coming from the N exiting outbound conveyors;
N final outbound conveyors, each configured to receive loads coming from the common conveyor and take them to one of the N preparing stations;
and wherein the managing unit is configured to organize the movements of the loads in the system as follows:
for each of the N ranks of nacelle locations, sequencing of loads according one sequence among N sequences and providing sequenced loads to the exiting outbound conveyor associated with said nacelle location rank;
transfer from the N exiting outbound conveyors to the common conveyor of the loads forming the N sequences;
for each of the N sequences, transfer of the loads forming said sequence from the common conveyor to one of the N final outbound conveyors.

10. The system according to claim 1, wherein each nacelle comprises a single location and the system comprises at least one transfer table type device configured to make transfers of loads from any one of the at least two horizontally adjacent entering outbound conveyors towards the single location of said nacelles.

11. The system according to claim 1, wherein each nacelle has a unique location and the system comprises, at least for one given preparing station, at least one transfer table type device configured to make transfers of loads from the unique location of said nacelles towards any one of the at least two exiting outbound conveyors that are horizontally adjacent and configured to remove the loads intended for said given preparing station from the paternoster.

12. The system according to claim 1, wherein the managing unit is configured for processing, in one of the following modes, each load that comes up via an entering return conveyor, to the entrance of the paternoster, after having been processed by said at least one preparing station:
(d) if the load is still necessary, within a first time period, for obtaining said at least one sequence: after introduction into the paternoster, the load undergoes at least one buffer transfer to a given buffer location and is then subsequently re-positioned in the paternoster and finally presented to said at least one exiting outbound conveyor;
(e) if the load is still necessary, in a second time period smaller than the first time period, for obtaining said at least one sequence: after introduction into the paternoster, the load is kept in the paternoster until it is presented to said at least one exiting outbound conveyor;
(f) if the load is still necessary, in a third time period smaller than the second time period, for obtaining said at least one sequence: after introduction into the paternoster, the load undergoes a bypass transfer between two nacelles situated face to face, and is then presented to said at least one exit outgoing conveyor;
(g) if the load is no longer necessary, for obtaining said at least one sequence: the load is introduced into the paternoster, then conveyed to said at least one exiting return conveyor.

13. The system according to claim 12, wherein, in the mode (g), after introduction into the paternoster, the load undergoes a bypass transfer between two nacelles positioned face to face.

14. The system according to claim 12, wherein, in the mode (d), before or after the at least one buffer transfer, the load undergoes a bypass transfer between two nacelles positioned face to face.

15. A method comprising:
sequencing loads coming from at least one external unit through at least one entering outbound conveyor and for providing at least one preparing station, through at least one exiting outbound conveyor, with at least one sequence comprising loads in a desired sequential order, said sequencing being implemented in a system comprising:
a managed elevator with nacelles, called a paternoster, circulating in a closed loop, each nacelle enabling the transportation of at least one load and being equipped with a device for transferring loads on to or out of said nacelle;

at least one buffer location, configured to temporarily receive at least one load coming from the paternoster; and a managing unit;

and wherein the sequencing comprises the managing unit organizing the movements of the loads in the system and processing each load that comes to the entrance of the paternoster through said at least one entering outbound conveyor, according to the following modes, one of which is selected according to a place desired for said load in said at least one sequence:

(a) after introduction into the paternoster, the load undergoes a bypass transfer between two nacelles positioned face to face, by implementation of the load transfer devices of the two nacelles, and is then presented to said at least one exiting outbound conveyor;

(b) after introduction into the paternoster, the load undergoes at least one buffer transfer towards a given buffer location and is then subsequently re-positioned in the paternoster and finally presented to said at least one exiting outbound conveyor;

(c) after introduction into the paternoster, the load is transported therein without bypass transfer or buffer transfer and then presented to said at least one exiting outbound conveyor.

* * * * *